Dec. 10, 1957     P. H. HARRER     2,815,852

AUGER CONVEYER EXTENSION

Filed Aug. 17, 1953

Inventor
Paul H. Harrer
by Kenneth␣␣␣␣␣␣
Attorney

2,815,852

AUGER CONVEYER EXTENSION

Paul H. Harrer, La Porte, Ind., assignor to Allis-Chalmers Manufacturing Company, Milwaukee, Wis.

Application August 17, 1953, Serial No. 374,623

4 Claims. (Cl. 198—213)

This invention is concerned with auger conveyers and more particularly with apparatus for readily aligning and rigidly coupling an extension to an auger conveyer.

One of the common uses for auger conveyers is for moving cut grain to an elevating conveyer in a combine harvester.

In combine harvesters the width of cut of grain which can be handled by a particular machine depends on the growth of grain being handled. In the semiarid parts of this country a combine harvester can utilize a grain cutting and conveying means much larger than that which can be used in more favorable grain growing areas. Manufacturers have heretofore provided different widths of headers for their harvesting equipment depending on where the machines are to be operated. In some areas it is desirable to have interchangeable headers, one for a poor crop year and a smaller one for a good crop year. Having two complete headers is an additional expense to a farmer. Therefore, it is an object of this invention to provide means for attaching an extension on an auger conveyer so that such auger conveyer can be utilized in a header of larger size and thereby save the farmer the cost of the larger auger conveyer.

Another object of this invention is to provide an extended auger conveyer having substantially the same strength as a one piece auger conveyer of the same length.

A further object of this invention is to provide an extension auger conveyer which can be rotated relative to the main auger conveyer so that flighting on the two augers can be matched without specific relationship in construction of the flange bolts relative to the flightings.

A further object of this invention is to provide means for coupling and aligning an auger extension tube without maintaining close tolerances in the tube diameter or accurate location of auger flighting on the tube extension.

A further object of this invention is to provide an easily attached auger extension of low cost. A further object of this invention is to provide a built up auger conveyer which is adjustable as to length.

Accordingly, the invention may be considered as consisting of the various details of construction, correlation of elements and arrangements of parts as is more fully set forth in the appended claims and the detailed description, reference being had to the accompanying drawings, in which:

Figure 1:
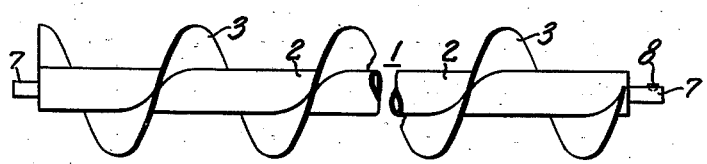
Fig. 1 is a side elevation of a conventional auger conveyer.

Referring to Fig. 1, an auger conveyer 1 is seen, including a main tube 2 having spiral flighting 3 attached to the periphery thereof coacting with a material supporting surface (not shown) to move material in a general direction of the longitudinal axis of the conveyer in response to rotation of the auger conveyer 1 about its longitudinal axis. Within the ends of auger conveyer 1 are received end members 4 which are attached to the conveyer by removable means such as nuts and bolts 6. End members 4 are attached at their center to stub shafts 7 as by riveting. The outer portion of at least one of the stub shafts 7 is provided with a slot for receiving a key 8 upon which a member (not shown) may be mounted for driving auger conveyer 1. Stub shafts 7 are also journaled in suitable bearings (not shown) for supporting the conveyer.

Figure 2:
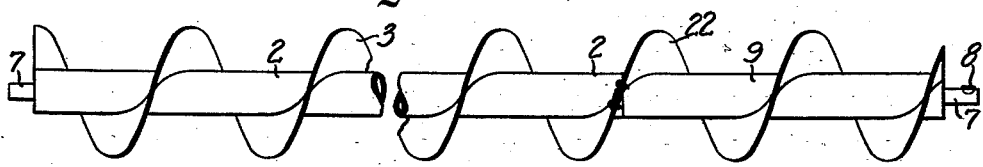
Fig. 2 is a side elevation of a conventional auger conveyer having an extension thereon embodying the invention.
Figure 3:
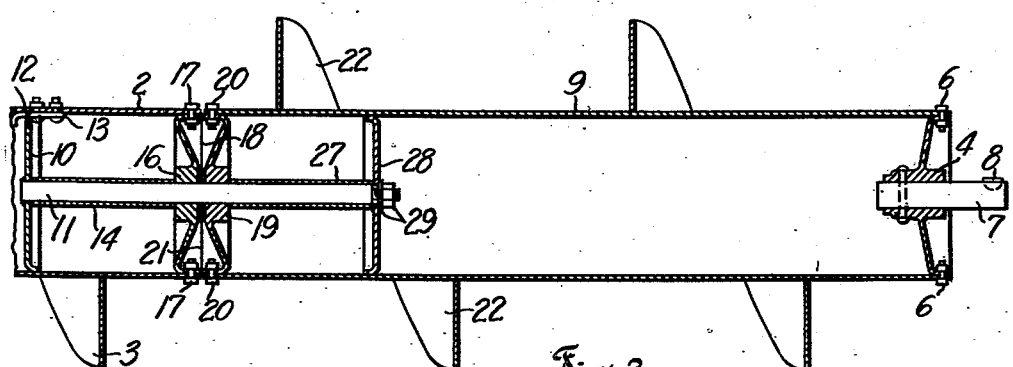
Fig. 3 is a vertical cross section view of a portion of the conveyer shown in Fig. 2 embodying the invention.

An extension tube 9 of any desired length having substantially the same diameter as tube 2 (see Fig. 2) is attached thereto and forms a continuation thereof. The manner in which extension tube 9 is attached to main tube 2 is as follows: One of the end members 4 and its shaft 7 is removed from tube 2. A disk 10 welded to the end of rod 11 is then slid into main tube 2. Circular disk 10 has an outer diameter substantially equal to the inner diameter of main tube 2 and is provided with a slot 12 (see Fig. 3) which receives a clip 13 fastened to the internal surface of main tube 2. This clip prevents a relative rotation between disk 10 and tube 2 but permits a longitudinal relative movement of disk 10 and tube 2. A spacer tube 14 is then slid over rod 11 until disk 10 is contacted thereby. A coupling head 16 is then slid over rod 11 until spacer tube 14 is contacted. Coupling head 16 has a peripheral flange within and connected in fixed relation to main tube 2 by means of nuts and bolts 17. As shown in Fig. 3, coupling head 16 has an outer diameter substantially equal to the inner diameter of main tube 2 and is bolted thereto with an axial thrust transmitting end face 18 positioned slightly outwardly from tube 2. A coupling head 19 is then bolted to extension tube 9. Coupling head 19 has an outer diameter substantially equal to the inner diameter of tube 9 so that it will be snugly received therein. Coupling head 19, like coupling head 16, has a peripheral flange within and connected in fixed relation to extension tube 9 as by means of nuts and bolts 20 with an axial thrust transmitting end face 21 of coupling head 19 positioned slightly outwardly from extension tube 9 and in abuttable relation to axial thrust transmitting end face 18 of coupling head 16. Tube 9 and coupling head 19 are then slid over rod 11 until transverse machined faces 18 and 21 are abutting each other. Tube 9 is then rotated about rod 11 until spiral flighting 22 on tube 9 forms a continuation of the flighting 3 on main tube 2. It will be noted that the end of the flighting 22 adjacent tube 2 has an overlapping portion 23 which contacts flighting 3 when tube 9 is rotated. Flighting 3 is joined to overlapping portion 23 (see Fig. 5) by means of a strap member 24 and nuts and bolts 26. A spacer tube 27 is then slid over rod 11 until it contacts coupling head 19. A disk 28 is then slid over rod 11 until it contacts the other end of spacer tube 27. It will be noted that the free end of rod 11 is threaded. A lock washer and nut 29 are attached to the threaded end of rod 11 and are drawn up tightly against disk 28, which in turn causes spacer tubes 14 and 27 to bear against couplings 16 and 19, respectively, in clamping relation thereto maintaining extension tube 9 in rigid alignment with main tube 2. It will be noted that disks 10 and 28 act as reinforcements for the combined tubes minimizing any tendency for the tubes to bend at their joinder surfaces. To complete the extended auger conveyer, end member 4 with its shaft 7 is bolted into the end of tube 9 remote from tube 2.

Figures 4, 5:
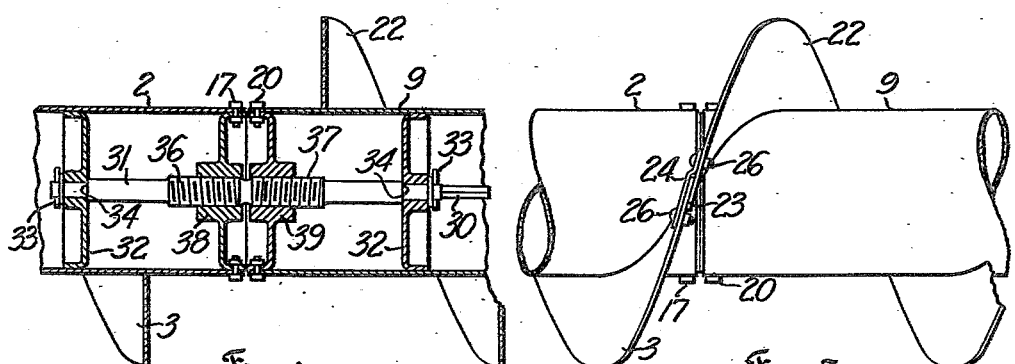
Fig. 4 is a view corresponding to Fig. 3 showing a different embodiment of the invention.
Fig. 5 is an enlarged portion of Fig. 2 showing the manner in which the flighting on the two sections is joined.

Referring to Fig. 4 another embodiment of the invention is seen. A rod 31 is journaled in a pair of disks 32 which are positioned adjacent opposite ends of the rod and are prevented from movement along the rod as by means of cotter pins 33 retaining the disks in abutting relation to shoulders 34 on rod 31. The midportion of rod 31 is threaded with a right hand thread portion 36 and an adjoining left hand thread portion 37. Threadably engaged with portion 36 is a coupling plate 38 and threadably engaged with portion 37 is a coupling plate 39. The diameter of plate 38 approximates the internal diameter of tube 2 while the diameter of plate 39 approximates the internal diameter of tube 9. One end of rod 31 is provided with a square configuration 30 so that a socket wrench or the like (not shown) can be attached for rotating rod 31.

With coupling plates 38 and 39 mounted on portions 36 and 37, respectively, and with the opposed faces of these plates positioned in spaced relation coupling plate 38, a portion of rod 31 and a disk 32 mounted thereon are inserted into tube 2 and coupling plate 38 is bolted to tube 2 in the same manner as described concerning the first embodiment. Coupling plate 39, a portion of rod 31 and the other disk 32 are then slid into tube 9. Tube 9 is then rotated until the flighting thereon is in alignment with the flighting on tube 2. Coupling plate 39 is then bolted to tube 9 and rod 31 is rotated until the opposed surfaces of the coupling plates are clampingly abutting each other. The flighting is then joined in the same manner described for the first embodiment and an end member 4 with its stub shaft 7 is then bolted into the free end of tube 9.

In the embodiment of the invention, illustrated by Fig. 3, the shaft 11 and the nut 29 thereon, together with the spacer tubes 14 and 27, represent axially contractible and expansible thrust transmitting means which are operatively connected with the coupling heads 16 and 19 for clamping same in abutting relation and thereby preventing relative movement of tubes 2 and 9. Similarly, the shaft 31 in Fig. 4 with its oppositely threaded portions 36 and 37 and the associated internal threads of the coupling heads 38 and 39 represent axially contractible and expansible thrust transmitting means which are operatively connected with the coupling heads 38 and 39.

In both of the embodiments described, it is not necessary that the extension tube 9 be the same size as the main tube 2 and it is not necessary that the bolt holes in the tubes through which the coupling heads are attached be in specific relation with the flighting thereby resulting in lower manufacturing costs than such extensions called for in the prior art.

The present invention is applicable to all auger type conveyers. And accordingly it should be understood that it is not intended to limit the invention to the exact details of construction and combination herein disclosed by way of example, as various modifications within the scope of the appended claims may occur to persons skilled in the art.

It is claimed and desired to secure by Letters Patent:

1. An auger conveyer including a main tube, an extension tube forming a continuation of said main tube, a first end member received within and being joined to one end of said conveyer, a second end member received within and joined to the other end of said conveyer, said end members being attached to stub shafts for supporting and driving said conveyer, and means for retaining said extension tube in continuing relation to said main tube, said retaining means including a first coupling head having a peripheral portion within and connected in fixed relation to the end of said extension tube positioned adjacent one end of said main tube, a second coupling head having a peripheral portion within and connected in fixed relation to said one end of said main tube, said coupling heads being provided with relatively abuttable, axial thrust transmitting end faces, respectively; and axially contractible and expansible thrust transmitting means including a shaft extending lengthwise of said conveyer and operatively connected with said coupling heads for clamping same in abutting relation for preventing relative movement of said tubes.

2. An auger conveyer including a main tube, an extension tube forming a continuation of said main tube, a first end member received within and being joined to one end of said conveyer, a second end member received within and joined to the other end of said conveyer, said end members being attached to stub shafts for supporting and driving said conveyer, means for retaining said extension tube in continuing relation to said main tube, said retaining means including a first coupling head received within and attached to the end of said extension tube positioned adjacent said main tube, a second coupling head received within and attached to the end of said main tube positioned adjacent said extension tube, said coupling heads being provided with aligned openings for receiving a shaft extending lengthwise of said conveyer, a pair of disk members mounted on said shaft adjacent the ends thereof and contacting inner portions of said tubes in reinforcing relation thereto, and means operatively connecting said shaft and said coupling heads for clamping the latter in side abutting relation for preventing relative movement of said tubes.

3. An auger conveyer including a longitudinally extending main tube, an extension tube having one end thereof abutting one end of and forming a continuation of said main tube, a first end member joined to the other end of said main tube, a second end member received within and joined to the other end of said extension tube, said end members being attached to stub shafts for supporting and driving said conveyer, means for retaining said extension tube in end abutting continuing relation to said main tube, said retaining means including a first transversely extending coupling head received within and joined to said one end of said main tube and a second transversely extending coupling head received within and joined to said one end of said extension tube, said coupling heads being provided with longitudinally aligned openings for slidably receiving a shaft therethrough, means on one end of said shaft coacting with said main tube for preventing rotary movement of said shaft relative to said main tube, and means on the other end of said shaft and operatively connected with said coupling heads for clamping same in abutting relation for preventing relative movement of said tubes.

4. In an auger conveyer as recited in claim 2, said shaft having a first transversely extending disk rigidly attached at one end thereof with the peripheral surface of said disk contacting inner portions of said main tube, a second transversely extending disk member longitudinally slidably received on the other end of said shaft, a first spacer element mounted about said shaft in end abutting relation to said first disk and said first coupling head, a second spacer element mounted about said shaft in end abutting relation to said second disk and said second coupling head, means operatively interconnected between said first disk and said main tube for preventing rotary movement of said disk relative to said main tube and permitting longitudinal movement of said first disk relative to said main tube, and means on the other end of said shaft and coacting with said disks and said spacer elements for clamping said coupling heads in abutting relation preventing relative motion therebetween.

References Cited in the file of this patent

UNITED STATES PATENTS

| | | |
|---|---|---|
| 2,214,177 | Raybould | Sept. 10, 1940 |
| 2,271,159 | Crawford | Jan. 27, 1942 |
| 2,424,810 | Escher | July 29, 1947 |
| 2,476,265 | Peterson | July 12, 1949 |
| 2,477,970 | Downing et al. | Aug. 2, 1949 |